United States Patent [19]

Hiltebrand

[11] 4,358,086

[45] Nov. 9, 1982

[54] BUTTERFLY VALVE

[75] Inventor: Eduard Hiltebrand, Schaffhausen, Switzerland

[73] Assignee: George Fischer Ltd., Switzerland

[21] Appl. No.: 195,052

[22] Filed: Oct. 8, 1980

[30] Foreign Application Priority Data

Oct. 9, 1979 [CH] Switzerland ............... 9080/79

[51] Int. Cl.³ ........................... F16K 1/22
[52] U.S. Cl. .................... 251/306; 251/308
[58] Field of Search ............ 251/306, 308, 305, 214

[56] References Cited

U.S. PATENT DOCUMENTS

| | | | |
|---|---|---|---|
| 2,385,510 | 9/1945 | Harwood | 251/306 |
| 3,215,400 | 11/1965 | Muller | 251/306 |
| 3,471,121 | 10/1969 | Geiselman | 251/308 |
| 3,526,385 | 9/1970 | Rohrer | 251/306 |
| 3,697,042 | 10/1972 | Killian | 251/308 |
| 3,837,620 | 9/1974 | Malloy et al. | 251/306 |
| 3,902,697 | 9/1975 | Robinson | 251/306 |
| 3,916,943 | 11/1975 | Hester et al. | 251/214 |
| 3,988,000 | 10/1976 | Reese | 251/305 |
| 4,025,050 | 5/1977 | Manki | 251/306 |
| 4,036,469 | 7/1977 | Robinson | 251/306 |
| 4,125,248 | 11/1978 | Teramura | 251/308 |
| 4,146,206 | 3/1979 | Malloy et al. | 251/306 |

Primary Examiner—H. Jay Spiegel
Attorney, Agent, or Firm—Roylance, Abrams, Berdo & Farley

[57] ABSTRACT

A butterfly valve includes a gasket on the pivotable member which has a peripheral ring portion and two end rings which are concentric to the shaft supporting the pivotable member, each end ring having a flange held under spring pressure between the pivotable member and bushings on the shaft ends. The gasket thus seals the valve against leakage to the outside and to the shaft.

6 Claims, 5 Drawing Figures

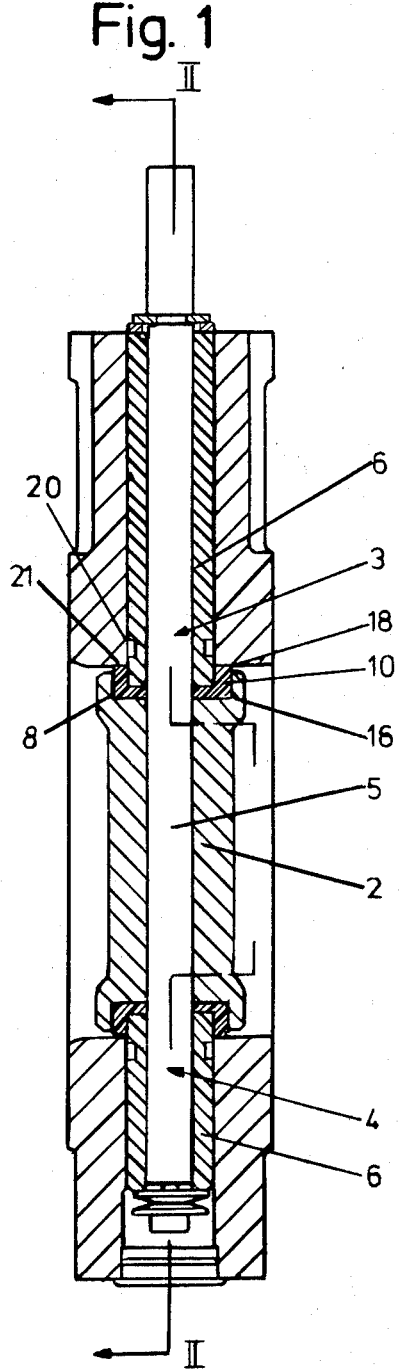
Fig. 1
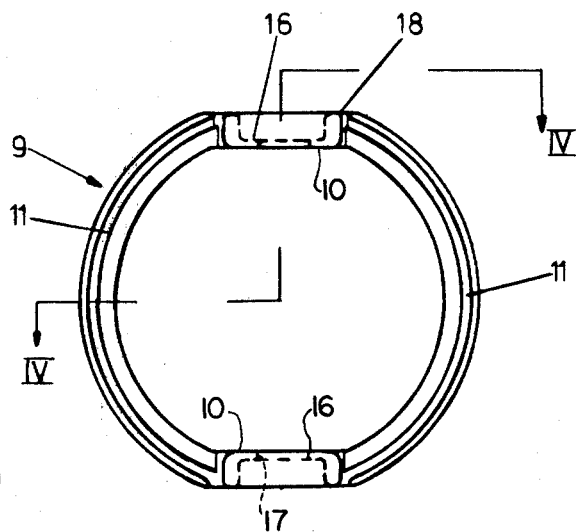
Fig. 3
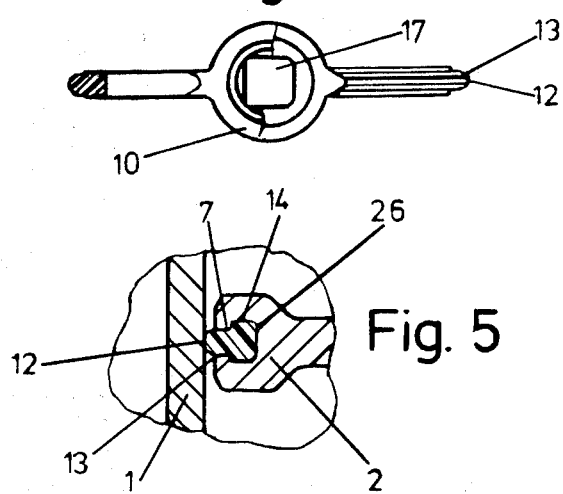
Fig. 4
Fig. 5

BUTTERFLY VALVE

This invention relates to a butterfly valve, the pivoted flap valve element of which is supported between two ends of a continuous shaft in a housing, and to an improved gasket structure.

BACKGROUND OF THE INVENTION

It is well known to provide a valve of the butterfly valve type in which a disc is supported on a diametrically extending shaft or shafts in a circular bore of a valve housing. Various efforts have been made to provide gaskets and seals to prevent or at least inhibit flow of the valved medium when the valve is in its closed position, i.e., leakage.

A valve of this general type is shown in U.S. Pat. No. 2,385,510 which includes structure at the transitions between rings concentric to the support shafts and the gasket ring disposed in a peripheral groove on the pivoted valve member such that a complete seal between the pivotable valve, the shaft and the bearing for the shaft is not possible, leading to losses through leakage of the flowing medium.

In a butterfly valve shown in U.S. Pat. No. 3,526,385, an attempt is made to improve the sealing action by disposal of cylindrical parts on the rings of the seal concentric to the shaft. The cylindrical parts lie in recesses of the pivotable valve member so that the periphery of the cylindrical part is against the valve and the inner part thereof is against the shaft. Improvement is possible with this structure to a limited degree only when a soft sealing raw material is used and the production tolerances of the parts is kept small.

Also, the insertion of a gasket ring with cylindrical parts to the grooves and recesses of the pivoting member requires an elastic or soft sealing material which is, therefore, not wear-resistant because of the decreased inside diameter, that material being exposed to wear as a result of the valve member movement.

BRIEF DESCRIPTION OF THE INVENTION

An object of the present invention is to provide a butterfly valve which provides a good seal against the outside with no leakage losses, even when the valve member is closed, and to make possible the use of a gasket which resists wear and attack by the fluid medium.

Briefly described, the invention includes a butterfly valve apparatus of the type having a pivotable valve member supported in a housing by the ends of a continuous diametral shaft and a one-piece gasket having three ring portions including a first ring portion extending around the periphery of the valve member and second and third ring portions concentrically surrounding the shaft ends, the improvement wherein the shaft ends include means defining surfaces facing said valve member, and wherein each of said second and third ring portions includes an inwardly extending flange disposed between the valve member and the adjacent facing surface of one of said shaft ends, the apparatus further including spring means for urging the flanges and the facing surfaces into abutting relationships.

As a result of the arrangement of flanges on the second and third rings of the gasket according to the invention, which are fastened in a tightly sealed arrangement by means of spring tension, losses through leakage by drainage along the shaft are avoided. Because, in that arrangement, the shaft does not come into contact with the flow-through medium under any circumstances, the shaft can be produced from metal, even when the valve is used in a conduit carrying an aggressive or corrosive medium and it is desirable to do so for reasons of strength, even when the remaining parts consist of plastic.

Since the inside diameter of the gasket is not decreased by the arrangement of the flanges, mounting of the gasket on the hinged valve is possible even when a less soft or elastic material of the gasket is used, thus permitting the use of wear-resistant materials for the gasket structure.

By fastening the gasket in place using spring tension, the fastening force and, thus, the sealing effect, is established permanently and constantly, and no impermissible surface pressures can develop on the gasket as a result of improper mounting. The occasional event of production tolerances and wear are always balanced out.

In order that the manner in which the foregoing and other objects are attained in accordance with the invention can be understood in detail, a particularly advantageous embodiment thereof will be described with reference to the accompanying drawing, which form a part of this specification, and wherein:

FIG. 1 is a transverse sectional view through a butterfly valve constructed in accordance with the present invention;

FIG. 3 is a plan view of a gasket structure, apart from the remainder of the valve structure, usable in the apparatus of FIGS. 1 and 2;

FIG. 4 is a partial sectional end view along line IV—IV of FIG. 3; and

FIG. 5 is an enlarged partial sectional view along line V—V of FIG. 2.

Figure 2:
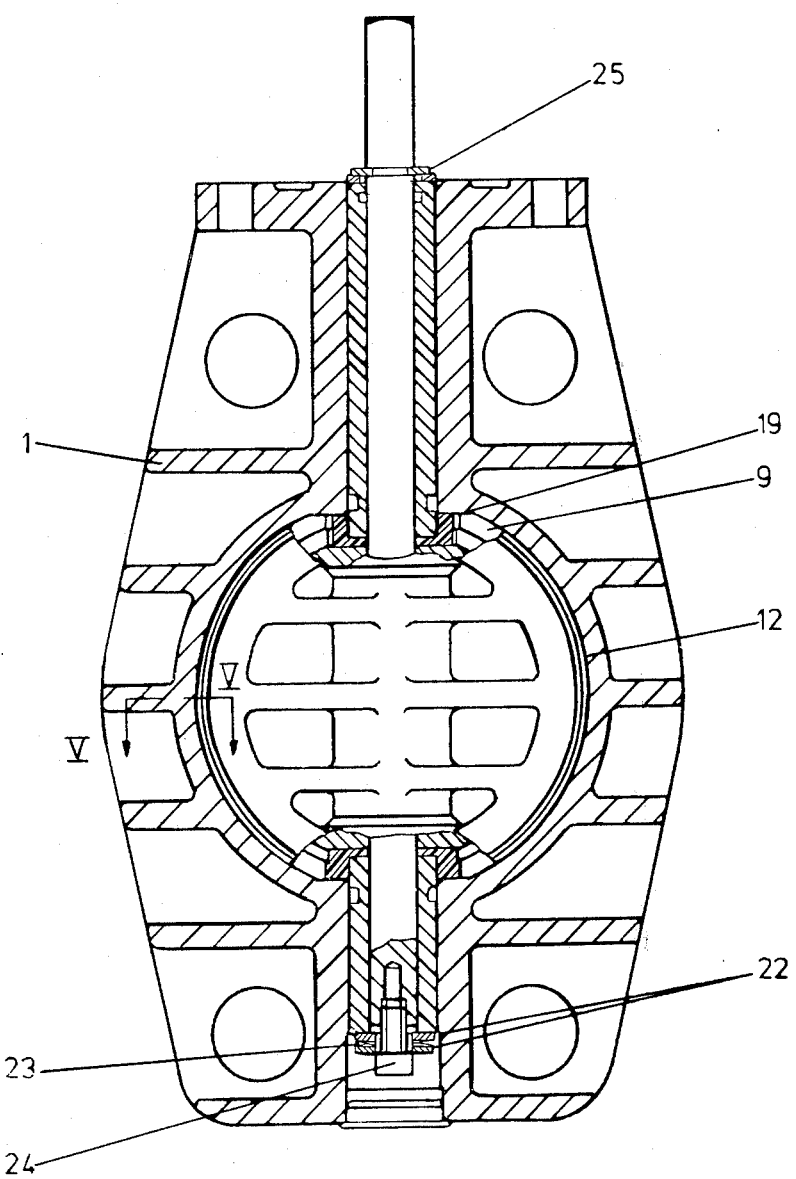
FIG. 2 is a plan view, in partial section, along line II—II of FIG. 1.

As shown in FIGS. 1 and 2, the valve in accordance with the present invention includes a housing 1 which can be inserted between pipes or conduits carrying the medium to be controlled, and a circular pivotable valve member 2 is rotatably mounted and supported on a shaft which has shaft ends 3 and 4 extending into the housing. The support includes a shaft 5 which is preferably square in cross section, the shaft extending through the body of the movable valve member 2 and also extends through bushings 6 which, together with the ends of shaft 5, form shaft ends 3 and 4. Shaft 5 projects beyond the housing at one end so that an adjusting member, not shown, such as a handle or a drive link can be attached for operation of the valve. As a result of the square cross sectional shape of the shaft 5, its torsional connection with the movable valve member 2 and bushings 6, as well as to the adjusting member, results in low specific surface pressure. The term "specific surface pressure" is used to mean pressure per unit area of the mating parts. Pivotable valve member 2 is provided around its periphery with an annular groove 7, best seen in FIG. 5, and is also provided with diametrically opposite cylindrical recesses 8, which recesses are concentric with shaft 5, the groove 7 and recesses 8 receiving the various portions of a gasket 9.

The gasket is shown in more detail in FIGS. 3, 4 and 5, and includes two diametrically opposite rings 10 and two ring halves 11 which interconnect the two rings 10, and which forms a ring with the rings 10, the gasket being made of a single piece of material. As seen in FIGS. 4 and 5, the ring halves 11, which are received in groove 7, have a substantially flat sealing surface 12 on the outer periphery thereof, that surface being joined to two slamming surfaces 13. On the axially facing surfaces of the ring halves 11, semi-annular projections 74 extend, these projections being provided for the purpose of lying in lateral recesses 26 of the groove 7 which holds the gasket 9 in groove 7 against radial outward movement from valve member 2.

The end rings 10 are formed in a cylindrical shape, somewhat in the nature of a short section of pipe with circular cross section, and each of the rings is provided with an inwardly extending flange 16 which preferably has means defining square openings 17 therethrough. The outer portion of each ring 10, opposite the flange 16, has a flat sealing surface 18 which, when assembled in the valve, fits in a tight sealing relationship against a flat inside surface 19 of the housing (see FIG. 2).

As additional gaskets against fluid leakage to the outside, sealing rings 20 are provided in bushings 6, these being in the nature of O rings.

The gasket is made from an abrasion resistant elastomer, resistant against most media expected to be flowing through the valve, the Shore hardness of the elastomer preferably being in the range of between about 60 and about 80.

The elasticity of the gasket 9 is just sufficient to permit it to be inserted into the groove 7 and recesses 8 of the movable valve member 2, but as a result of the pressure of the flow medium, or in the case of turning of the valve member 2, no deformation will develop in the sealing surfaces 12, 18.

The flanges 16 of the gasket 9, as can be seen from FIGS. 1 and 2, are disposed in the recesses 8 and are fastened between the pivotable valve member 2 and the frontal surfaces 21 of the bushings 6, the frontal surfaces being the flat end surfaces of those bushings. The force accomplishing this fastening is provided by spring means 23 which is disposed at the lower end of the shaft 5 as seen in FIGS. 1 and 2. The spring preferably comprises cup springs which are disposed between flat discs 22, the assembly of the springs being fastened onto the shaft and placed under compressive force by a screw 24 which is threadedly received in the end of shaft 5. As will be seen, the bushing 6 at the shaft end 4 protrudes beyond the end of shaft 5, permitting the force applied by screw 24 to be adjustable and to thereby establish a predetermined pre-compression in the springs. At the upper end of the shaft, as seen in FIGS. 1 and 2, the bushing is axially restrained by a retaining ring 25 which fits in an annular groove in shaft 5. All of the axially abutting components, including bushings 6, flanges 16 and the recesses in valve member 2, as assembled on shaft 5, fit against each other with a pressure predetermined by the spring elements 23 so that production tolerances are compensated for and the flanges 16 of the gasket 9 are fastened with a predetermined uniform force.

The sealing surfaces 12 and 18, which abut against the housing 1, have a low specific surface load because of their relatively large contact surfaces, resulting in minimum wear of the gasket.

Housing 1, valve member 2 and bushings 6 are preferably produced from a polymeric or plastic material such as, for example, polyvinylchloride or polypropylene, as a result of which the butterfly valve can be used for aggressive or corrosive media such as, for example, acids and lye solutions.

Since, for reasons of strength, the shaft 5 is made of metal, the sealing of shaft 5 against the flow medium is particularly important. This sealing is achieved, as will be evident from the foregoing description, by the flanges 16 of the gasket 9 which are fastened with predetermined constant pressure.

While one advantageous embodiment has been chosen to illustrate the invention it will be understood by those skilled in the art that various changes and modifications can be made therein without departing from the scope of the invention as defined in the appended claims.

What is claimed is:

1. A butterfly valve apparatus of the type having a pivotable valve member supported in a housing by the ends of a continuous diametral shaft and a one-piece gasket having three ring portions including a first ring portion extending around the periphery of the valve member and second and third ring portions concentrically surrounding the shaft ends, the improvement wherein said shaft ends include means defining surfaces facing said valve member, at least one of said means and said valve member being slideably mounted on said shaft, and wherein each of said second and third ring portions includes an inwardly extending preformed flange disposed between said valve member and engaged by the adjacent facing surface of one said shaft ends, said apparatus further including spring means for urging said flanges and said facing surfaces into abutting relationships, said spring means including spring elements mounted on one end of said shaft, and means for exerting a predetermined compressive force on said spring elements, said means for exerting including abutment means engaging said spring means on a side thereof remote from said valve member.

2. An apparatus according to claim 1 wherein each of said shaft ends includes a bushing nonrotatably mounted on said diametral shaft, the inner end of each said bushing forming a facing surface.

3. An apparatus according to claim 2 wherein said shaft is square in cross section and each said flange includes means defining a square opening therein.

4. An apparatus according to any of claims 1-3 wherein each of said second and third rings is cylindrical and is mounted concentrically on one of said shaft ends, and wherein said movable valve member includes means defining cylindrical recesses for receiving said second and third rings.

5. An apparatus according to claim 4 wherein each of said second and third rings includes a flat sealing surface facing away from said valve member and abutting said housing.

6. An apparatus according to claim 1 wherein said gasket is formed from an elastomeric material having a Shore hardness of between about 60 and about 80.

* * * * *